United States Patent
Wang et al.

(10) Patent No.: US 9,542,440 B2
(45) Date of Patent: Jan. 10, 2017

(54) ENTERPRISE GRAPH SEARCH BASED ON OBJECT AND ACTOR RELATIONSHIPS

(71) Applicant: MICROSOFT TECHNOLOGY LICENSING, LLC, Redmond, WA (US)

(72) Inventors: Øivind Wang, Oslo (NO); Nicolai Bodd, Stabekk (NO); Chen Xing, Bellevue, WA (US); Bård Kvalheim, Oslo (NO); Torbjørn Helvik, Oslo (NO)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 5 days.

(21) Appl. No.: 14/070,734

(22) Filed: Nov. 4, 2013

(65) Prior Publication Data

US 2015/0127677 A1    May 7, 2015

(51) Int. Cl.
    *G06F 17/30* (2006.01)
(52) U.S. Cl.
    CPC ... *G06F 17/30424* (2013.01); *G06F 17/30286* (2013.01); *G06F 17/30958* (2013.01)
(58) Field of Classification Search
    USPC .......................................... 707/706, 769, 798
    See application file for complete search history.

(56) References Cited

U.S. PATENT DOCUMENTS

| | | | |
|---|---|---|---|
| 6,434,556 B1 | 8/2002 | Levin et al. | |
| 7,031,961 B2 | 4/2006 | Pitkow et al. | |
| 7,055,168 B1 | 5/2006 | Errico et al. | |
| 7,444,344 B2 | 10/2008 | Galindo-Legaria et al. | |
| 7,571,121 B2 | 8/2009 | Bezos et al. | |
| 7,577,718 B2 | 8/2009 | Slawson et al. | |
| 7,587,101 B1 | 9/2009 | Bourdev | |
| 7,640,236 B1 | 12/2009 | Pogue | |

(Continued)

FOREIGN PATENT DOCUMENTS

| | | |
|---|---|---|
| EP | 2426634 A1 | 3/2012 |
| EP | 2764489 A1 | 8/2014 |

(Continued)

OTHER PUBLICATIONS

Soussi, Rania, "Querying and Extracting Heterogeneous Graphs from Structured Data and Unstrutured Content", In Doctoral Dissertation, Ecole Centrale Paris, Jun. 22, 2012, 208 pages.

(Continued)

*Primary Examiner* — Hanh Thai
(74) *Attorney, Agent, or Firm* — Julie Kane Akhter; Tom Wong; Micky Minhas

(57) ABSTRACT

Systems, methods, and software are disclosed herein for implementing enterprise graph search. In at least one implementation, an enterprise search service receives a search request that includes a graph query directed to an enterprise graph. The graph is representative of various objects and actors associated with an enterprise, as well as which of the actors performed which of various actions with respect to each of the various objects. The service searches at least a portion of the enterprise graph to identify a subset of the objects that relate to the actors as defined by the graph query in terms of at least the actors and actions. A reply to the search request may include graph results indicative of the subset of the objects.

20 Claims, 6 Drawing Sheets

(56) References Cited

U.S. PATENT DOCUMENTS

| | | |
|---|---|---|
| 7,761,447 B2 | 7/2010 | Brill et al. |
| 7,783,630 B1 | 8/2010 | Chevalier et al. |
| 7,873,641 B2 | 1/2011 | Frieden et al. |
| 7,890,501 B2 | 2/2011 | Lunt et al. |
| 7,945,571 B2 | 5/2011 | Wanker |
| 7,958,116 B2 | 6/2011 | House et al. |
| 7,962,481 B2 | 6/2011 | Ganesh et al. |
| 8,005,817 B1* | 8/2011 | Amer-Yahia ..... G06F 17/30929 707/713 |
| 8,060,513 B2 | 11/2011 | Basco et al. |
| 8,065,383 B2 | 11/2011 | Carlson et al. |
| 8,204,870 B2 | 6/2012 | Mukkamala et al. |
| 8,204,888 B2 | 6/2012 | Frieden et al. |
| 8,209,349 B2 | 6/2012 | Howes et al. |
| 8,214,325 B2 | 7/2012 | Navas |
| 8,266,144 B2 | 9/2012 | Tankovich et al. |
| 8,301,764 B2 | 10/2012 | Konig et al. |
| 8,312,056 B1 | 11/2012 | Peng et al. |
| 8,341,017 B2 | 12/2012 | Payne et al. |
| 8,341,150 B1 | 12/2012 | Riley et al. |
| 8,346,765 B2 | 1/2013 | Guo et al. |
| 8,380,562 B2 | 2/2013 | Toebes et al. |
| 8,386,515 B2 | 2/2013 | Bent et al. |
| 8,463,795 B2 | 6/2013 | Van Hoff |
| 8,538,959 B2 | 9/2013 | Jin et al. |
| 8,601,023 B2 | 12/2013 | Brave et al. |
| 8,751,621 B2 | 6/2014 | Vaynblat et al. |
| 8,751,636 B2 | 6/2014 | Tseng et al. |
| 8,775,334 B1 | 7/2014 | Lloyd et al. |
| 8,782,036 B1* | 7/2014 | Chen ................. G06F 17/30011 707/723 |
| 8,812,947 B1 | 8/2014 | Maoz et al. |
| 8,825,649 B2 | 9/2014 | Heimendinger et al. |
| 8,825,711 B2 | 9/2014 | Chan et al. |
| 8,874,550 B1 | 10/2014 | Soubramanien et al. |
| 8,886,633 B2 | 11/2014 | Smyth et al. |
| 8,909,515 B2* | 12/2014 | O'Neil et al. ..................... 704/9 |
| 8,996,631 B1 | 3/2015 | Staddon et al. |
| 9,223,866 B2 | 12/2015 | Marcucci et al. |
| 2001/0034859 A1* | 10/2001 | Swoboda ............. G06F 11/362 714/39 |
| 2002/0038299 A1 | 3/2002 | Zernik et al. |
| 2002/0169759 A1* | 11/2002 | Kraft et al. ........................ 707/3 |
| 2003/0025692 A1* | 2/2003 | Lu ........................ G01V 1/32 345/418 |
| 2003/0071814 A1 | 4/2003 | Jou et al. |
| 2004/0255237 A1 | 12/2004 | Tong |
| 2004/0267736 A1 | 12/2004 | Yamane et al. |
| 2005/0278321 A1 | 12/2005 | Vailaya et al. |
| 2005/0278325 A1 | 12/2005 | Mihalcea et al. |
| 2006/0074883 A1 | 4/2006 | Teevan et al. |
| 2006/0123014 A1 | 6/2006 | Ng |
| 2006/0294085 A1 | 12/2006 | Rose et al. |
| 2007/0162443 A1 | 7/2007 | Liu et al. |
| 2008/0005064 A1 | 1/2008 | Sarukkai |
| 2008/0010337 A1 | 1/2008 | Hayes |
| 2008/0016053 A1 | 1/2008 | Frieden et al. |
| 2008/0086344 A1 | 4/2008 | Martini et al. |
| 2009/0049053 A1 | 2/2009 | Barker et al. |
| 2009/0094233 A1 | 4/2009 | Marvit et al. |
| 2009/0132516 A1 | 5/2009 | Patel et al. |
| 2009/0182727 A1 | 7/2009 | Majko |
| 2010/0063878 A1 | 3/2010 | Bachet et al. |
| 2010/0082695 A1 | 4/2010 | Hardt |
| 2010/0083151 A1 | 4/2010 | Lanza et al. |
| 2010/0179874 A1 | 7/2010 | Higgins et al. |
| 2010/0268703 A1* | 10/2010 | Buck ............................. 707/713 |
| 2011/0004831 A1 | 1/2011 | Steinberg et al. |
| 2011/0040617 A1 | 2/2011 | Moonka et al. |
| 2011/0055241 A1* | 3/2011 | Lewis ................. G06F 17/3064 707/766 |
| 2011/0060803 A1 | 3/2011 | Barlin et al. |
| 2011/0087644 A1 | 4/2011 | Frieden et al. |
| 2011/0145719 A1 | 6/2011 | Chen et al. |
| 2011/0214046 A1 | 9/2011 | Haberman et al. |
| 2011/0218946 A1 | 9/2011 | Stern et al. |
| 2011/0231381 A1 | 9/2011 | Mercuri |
| 2011/0271224 A1 | 11/2011 | Cruz Moreno et al. |
| 2012/0030169 A1 | 2/2012 | Allen et al. |
| 2012/0047114 A1 | 2/2012 | Duan et al. |
| 2012/0054303 A1 | 3/2012 | Priyadarshan et al. |
| 2012/0076367 A1 | 3/2012 | Tseng |
| 2012/0078896 A1 | 3/2012 | Nixon et al. |
| 2012/0158791 A1 | 6/2012 | Kasneci et al. |
| 2012/0209878 A1* | 8/2012 | Park ..................... G06F 3/04817 707/771 |
| 2012/0221558 A1 | 8/2012 | Byrne et al. |
| 2012/0221566 A1 | 8/2012 | Iwasa et al. |
| 2012/0239618 A1 | 9/2012 | Kung |
| 2012/0254790 A1 | 10/2012 | Colombino et al. |
| 2012/0271807 A1 | 10/2012 | Smyth et al. |
| 2012/0290399 A1 | 11/2012 | England et al. |
| 2012/0290637 A1 | 11/2012 | Perantatos et al. |
| 2012/0296918 A1 | 11/2012 | Morris et al. |
| 2012/0311139 A1 | 12/2012 | Brave et al. |
| 2012/0324002 A1 | 12/2012 | Chen |
| 2012/0324027 A1 | 12/2012 | Vaynblat et al. |
| 2012/0330992 A1 | 12/2012 | Kanigsberg et al. |
| 2013/0006754 A1 | 1/2013 | Horvitz et al. |
| 2013/0013683 A1 | 1/2013 | Murthy |
| 2013/0031489 A1 | 1/2013 | Gubin et al. |
| 2013/0036230 A1 | 2/2013 | Bakos |
| 2013/0041896 A1 | 2/2013 | Ghani et al. |
| 2013/0054349 A1 | 2/2013 | Ogawa |
| 2013/0073280 A1* | 3/2013 | O'Neil ..................... G06F 17/27 704/9 |
| 2013/0073568 A1* | 3/2013 | Federov ............. G06F 17/30867 707/749 |
| 2013/0073632 A1* | 3/2013 | Fedorov ............... G06Q 10/101 709/205 |
| 2013/0073979 A1* | 3/2013 | Shepherd ................ G06Q 50/01 715/744 |
| 2013/0073983 A1* | 3/2013 | Rasmussen ............ G06Q 30/02 715/753 |
| 2013/0080218 A1 | 3/2013 | Wildern, IV et al. |
| 2013/0091149 A1* | 4/2013 | Dunn .................. G06F 17/3053 707/749 |
| 2013/0097143 A1 | 4/2013 | Shenoy et al. |
| 2013/0097184 A1 | 4/2013 | Berkhin et al. |
| 2013/0103683 A1 | 4/2013 | Haveliwala et al. |
| 2013/0110638 A1 | 5/2013 | Ogawa |
| 2013/0110978 A1 | 5/2013 | Gordon et al. |
| 2013/0124437 A1 | 5/2013 | Pennacchiotti et al. |
| 2013/0124613 A1 | 5/2013 | Plache et al. |
| 2013/0132138 A1 | 5/2013 | Doganata et al. |
| 2013/0151611 A1* | 6/2013 | Graham ................ G06Q 50/01 709/204 |
| 2013/0155068 A1 | 6/2013 | Bier et al. |
| 2013/0159096 A1 | 6/2013 | Santhanagopal et al. |
| 2013/0191416 A1 | 7/2013 | Lee et al. |
| 2013/0204706 A1 | 8/2013 | Tang et al. |
| 2013/0218885 A1 | 8/2013 | Satyanarayanan |
| 2013/0218899 A1 | 8/2013 | Raghavan et al. |
| 2013/0246521 A1 | 9/2013 | Schacht et al. |
| 2013/0262588 A1 | 10/2013 | Barak et al. |
| 2013/0268973 A1* | 10/2013 | Archibong ............. G06Q 50/01 725/51 |
| 2013/0288715 A1 | 10/2013 | Shieh et al. |
| 2013/0298084 A1 | 11/2013 | Spivack et al. |
| 2013/0326369 A1 | 12/2013 | Buchanon |
| 2013/0332523 A1 | 12/2013 | Luu |
| 2013/0346329 A1 | 12/2013 | Alib-Bulatao et al. |
| 2014/0013353 A1 | 1/2014 | Mathur |
| 2014/0040008 A1 | 2/2014 | Belani et al. |
| 2014/0040367 A1* | 2/2014 | Lessin ................... G06Q 50/01 709/204 |
| 2014/0040370 A1 | 2/2014 | Buhr |
| 2014/0040729 A1* | 2/2014 | Marlow ............. G06F 17/30867 715/240 |
| 2014/0041038 A1* | 2/2014 | Lessin ................... G06Q 50/01 726/26 |
| 2014/0046982 A1 | 2/2014 | Chan et al. |

(56) References Cited

U.S. PATENT DOCUMENTS

| | | | |
|---|---|---|---|
| 2014/0074602 | A1 | 3/2014 | van Elsas et al. |
| 2014/0074888 | A1* | 3/2014 | Potter et al. .................. 707/779 |
| 2014/0074934 | A1 | 3/2014 | van Hoff et al. |
| 2014/0156652 | A1 | 6/2014 | Abiola |
| 2014/0189530 | A1 | 7/2014 | Anand et al. |
| 2014/0207860 | A1 | 7/2014 | Wang et al. |
| 2014/0215351 | A1 | 7/2014 | Gansca et al. |
| 2014/0280080 | A1 | 9/2014 | Solheim et al. |
| 2014/0282029 | A1 | 9/2014 | Vishria |
| 2014/0324850 | A1 | 10/2014 | Magnaghi et al. |
| 2014/0330551 | A1* | 11/2014 | Bao ..................... G06F 17/2836 704/3 |
| 2014/0344288 | A1 | 11/2014 | Evans et al. |
| 2015/0120700 | A1 | 4/2015 | Holm et al. |
| 2015/0220531 | A1 | 8/2015 | Helvik et al. |
| 2015/0242402 | A1 | 8/2015 | Holm et al. |
| 2015/0242473 | A1 | 8/2015 | Brugard et al. |
| 2015/0248222 | A1 | 9/2015 | Stickler et al. |
| 2015/0248410 | A1 | 9/2015 | Stickler et al. |
| 2015/0248480 | A1 | 9/2015 | Miller et al. |
| 2015/0249715 | A1 | 9/2015 | Helvik et al. |
| 2015/0294138 | A1 | 10/2015 | Barak et al. |
| 2015/0379586 | A1 | 12/2015 | Mooney et al. |
| 2016/0034469 | A1 | 2/2016 | Livingston et al. |
| 2016/0070764 | A1 | 3/2016 | Helvik et al. |
| 2016/0203510 | A1 | 7/2016 | Pregueiro et al. |

FOREIGN PATENT DOCUMENTS

| | | |
|---|---|---|
| WO | 2008/111087 A2 | 9/2008 |
| WO | 2010/029410 A1 | 3/2010 |
| WO | 2013/026095 A1 | 2/2013 |
| WO | 2013/043654 A2 | 3/2013 |
| WO | 2013/123550 A1 | 8/2013 |
| WO | 2013/173232 A1 | 11/2013 |

OTHER PUBLICATIONS

Ubbesen, Christian, "Enterprise Graph Search", Published on: Jan. 28, 2013, Available at: http://www.findwise.com/blog/enterprise-graph-search/.

Hanada, Tetsuya, "Yammer—Enterprise Graph SharePoint", In Australian Sharepoint Conference, Jun. 11, 2013, 23 pages.

Yeung, Ken, "Yammer Unveils the Open Graph for the Enterprise, to Help make Business Apps More Social", Published on: Oct. 29, 2012, Available at: http://thenextweb.com/insider/2012/10/29/yammer-using-the-enterprise-graph/?utm_source=feedburner&utm_medium=feed&utm_campaign=Feed:+TheNextWeb+(The+Next+Web+All+Stories).

Giugno, et al., "GraphGrep: A Fast and Universal Method for Querying Graphs", In Proceedings of the 16th International Conference on Pattern Recognition, vol. 2, Aug. 11, 2002, 4 pages.

"Bing Ads targeting—training", Published on: Mar. 31, 2013 Available at: http://advertise.bingads.microsoft.com/en-ca/cl/245/training/bing-ads-targeting.

"Campaign Element Template Parameters—Training", Retrieved on: Oct. 1, 2014 Available at: https://www-304.ibm.com/support/knowledgecenter/SSZLC2_7.0.0/com.ibm.commerce.management-center_customization.doc/concepts/csbcustargdef.htm.

"Connections Enterprise Content Edition", Published on: Nov. 22, 2013 Available at: http://www-03.ibm.com/software/products/en/connections-ecm/.

"Enterprise Search from Microsoft", Published on: Jan. 2007, Available at: https://www.google.co.in/url?sa=t&rct=j&q=&esrc=s&source=web&cd=2&cad=rja&ved=0CDMQFjAB&url=http%3A%2F%2Fdownload.microsoft.com%2Fdownload%2Fd%2F0%2F1%2Fd0165e6d-11cb-464b-b24a-c019d82def0d%2FEnterprise%2520Search%2520from%2520Microsoft.doc&ei=IAq9UqueHoTtrAe5yoC4Bg&usg=AFQjCNEax9yYC0KGTUhr4bNIxTJpyyyhsA&bvm=bv.58187178,d.bmk.

"Facets for Enterprise Search Collections", Retrieved on: Jun. 17, 2014, Available at: http://pic.dhe.ibm.com/infocenter/analytic/v3r0m0/index.jsp?topic=%20Fcom.ibm.discovery.es.ad.doc%2Fiiysafacets.htm.

"Getting Started with your My Site", Published on: Apr. 6, 2013, Available at: http://office.microsoft.com/en-in/sharepoint-server-help/getting-started-with-your-my-site-HA101665444.aspx.

"How to Segment and Target Your Emails—Training", Published on: Aug. 15, 2014 Available at: http://www.marketo.com/_assets/uploads/How-to-Segment-and-Target-Your-Emails.pdf?20130828153321.

"Introducing Delve (codename Oslo) and the Office Graph", Published on: Mar. 11, 2014, Available at: http://blogs.office.com/2014/03/11/introducing-codename-oslo-and-the-office-graph/.

"Introduction to Managed Metadata", Retrieved on: Jun. 23, 2014 Available at: http://office.microsoft.com/en-001/office365-sharepoint-online-enterprise-help/introduction-to-managed-metadata-HA102832521.aspx.

"Persistent Search: Search's Next Big Battleground", Available at: http://billburnham.blogs.com/burnhamsbeat/2006/04/persistent_sear.html, Published on: Apr. 10, 2006, 3 pages.

"Turn search history off or on", retrieved from http://onlinehelp.microsoft.com/en-US/bing/ff808483.aspx, Retrieved date: Dec. 12, 2013, 1 page.

"Yammer the Enterprise Social Network", Published on: Sep. 9, 2013 Available at: https://about.yammer.com/product/feature-list/.

Amitay et al., "Social Search and Discovery using a Unified Approach", In Proceedings of the 20th ACM Conference on Hypertext and Hypermedia, Jun. 29, 2009, pp. 199-208.

Bailly, Nestor, "Finding the Best Video Content Using the Power of the Social Graph", Published on: Jul. 17, 2013 Available at: http://iq.intel.com/iq/35820000/finding-the-best-video-content-using-the-power-of-the-social-graph.

Bobadilla et al., "Recommender Systems Survey", In Journal of Knowledge-Based Systems, vol. 46, Jul. 2013, pp. 109-132.

Daly et al., "Social Lens: Personalization around user Defined Collections for Filtering Enterprise Message Streams", In Proceedings of the Fifth International AAAI Conference on Weblogs and Social Media, Published on: Jul. 17, 2011, 8 pages.

Diaz et al., "SIGIR 2013 Workshop on Time Aware Information Access (#TAIA2013)", In Proceedings of the 36th International ACM SIGIR Conference on Research and Development in Information Retrieval, Aug. 1, 2013, 41 pages.

Elbassuoni et al., "Language-Model-Based Ranking for Queries on RDF-Graphs", In Proceedings of the 18th ACM Conference on Information and Knowledge Management, Nov. 2, 2009, 10 pages.

Fan et al., "Tuning Before Feedback: Combining Ranking Discovery and Blind Feedback for Robust Retrieval", Retrieved at http://filebox.vt.edu/users/wfan/paper/ARRANGER/p52-Fan.pdf, 27th Annual International ACM SIGIR Conference on Research and Development in Information Retrieval, Jul. 25, 2004, 8 pages.

Fazio, Stephanie, "How Social is Enterprise Search?", Published on: Mar. 14, 2012, Available at: http://blogs.opentext.com/vca/blog/1.11.647/article/1.26.2007/2012/3/14/How_Social_is_Enterprise_Search%3F.

Fox, Vanessa, "Marketing in the Age of Google", John Wiley & Sons, Mar. 8, 2012, 3 pages.

Gruhl et al., "The Web beyond Popularity—A Really Simple System for Web Scale RSS", in Proceedings of the 15th International Conference on World Wide Web, May 23, 2006, pp. 183-192.

Guy et al., "Finger on the Pulse: The Value of the Activity Stream in the Enterprise", In Proceedings of 14th IFIP TC 13 International Conference on Human-Computer Interaction, Sep. 2, 2013, 18 pages.

Guy et al., "Personalized Recommendation of Social Software Items Based on Social Relations", In Proceedings of the Third ACM Conference on Recommender Systems, Oct. 2009, pp. 53-60.

Hackett, Wes, "Extending the Activity Feed with Enterprise Content", In Proceedings of ActivityFeed, Development, Featured, Sharepoint, Social Features, Jun. 16, 2011, 27 pages.

International Search Report and Written Opinion Issued in PCT Application No. PCT/US2014/063763, Mailed Date: Feb. 4, 2015, 7 Pages.

(56) References Cited

OTHER PUBLICATIONS

Josh, "Send Notifications to your Customers in their Timezone—training", Published on: Aug. 19, 2014 Available at: https://mixpanel.com/blog/2014/08/19/announcement-send-notifications-in-your-customer-s-timezone.

Kelly et al., "The Effects of Topic Familiarity on Information Search Behavior", Retrieved at http://www.ils.unc.edu/~dianek/kelly-jcd102.pdf, Joint Conference on Digital Libraries, Portland, Oregon, USA, Jul. 13, 2002, 2 pages.

Khodaei et al., "Social-Textual Search and Ranking", In Proceedings of the First International Workshop on Crowdsourcing Web Search, Apr. 17, 2012, 6 pages.

Kubica et al., "cGraph: A Fast Graph-Based Method for Link Analysis and Queries", In Proceedings of the IJCAI Text-Mining & Link-Analysis Workshop, Aug. 2003, 10 pages.

Li et al., "Personalized Feed Recommendation Service for Social Networks", In IEEE 2nd International Conference on Social Computing, Aug. 20, 2010, 8 pages.

Li et al., "Research of Information Recommendation System Based on Reading Behavior", In International Conference on Machine Learning and Cybernetics, vol. 3, Jul. 12, 2008, 6 pages.

Liang et al., "Highlighting in Information Visualization: A Survey", In Proceedings of 14th International Conference Information Visualisation, Jul. 26, 2010, pp. 79-85.

Masuch, Lukas, "Hack: Enterprise Knowledge Graph—One Graph to Connect them All", Published on: Mar. 28, 2014, Available at : http://www.managementexchange.com/hack/enterprise-knowledge-graph-one-graph-connect-them-all.

Muralidharan et al., "Social Annotations in Web Search", In Proceedings of the ACM Annual Conference on Human Factors in Computing Systems, May 5, 2012, 10 pages.

Pecovnik, Simon, "Enterprise Graph Search—take 1", Published on: Jan. 28, 2014, Available at: http://www.ravn.co.uk/2014/01/28/enterprise-graph-search/.

Perer et al., "Visual Social Network Analytics for Relationship Discovery in the Enterprise", In IEEE Conference on Visual Analytics Science and Technology, Published on: Oct. 23, 2011, 9 pages.

Ronen et al., "Social Networks and Discovery in the Enterprise (SaND)", In Proceedings of the 32nd International ACM SIGIR Conference on Research and Development in Information Retrieval, Jul. 19, 2009, 1 page.

Roth et al., "Suggesting Friends Using the Implicit Social Graph", In Proceedings of the 16th ACM SIGKDD International Conference on Knowledge Discovery and Data Mining, Jul. 25, 2010, 9 pages.

Yap, Jamie, "Graph Search Capabilities Offer Enterprise Benefits", Published on: Feb. 14, 2013, Available at: http://www.zdnet.com/graph-search-capabilities-offer-enterprise-benefits-7000011304/.

Zhibao et al., "EISI: An Extensible Security Enterprise Search System", In 2nd International Conference on Computer Science and Network Technology, Dec. 29, 2012, pp. 896-900.

"Second Written Opinion Issued in PCT Application No. PCT/US2014/063763", Mailed Date: Oct. 12, 2015, 5 Pages.

"International Preliminary Report on Patentability Issued in PCT Application No. PCT/US2014/063763", Mailed Date: Jan. 27, 2016, 6 Pages.

* cited by examiner

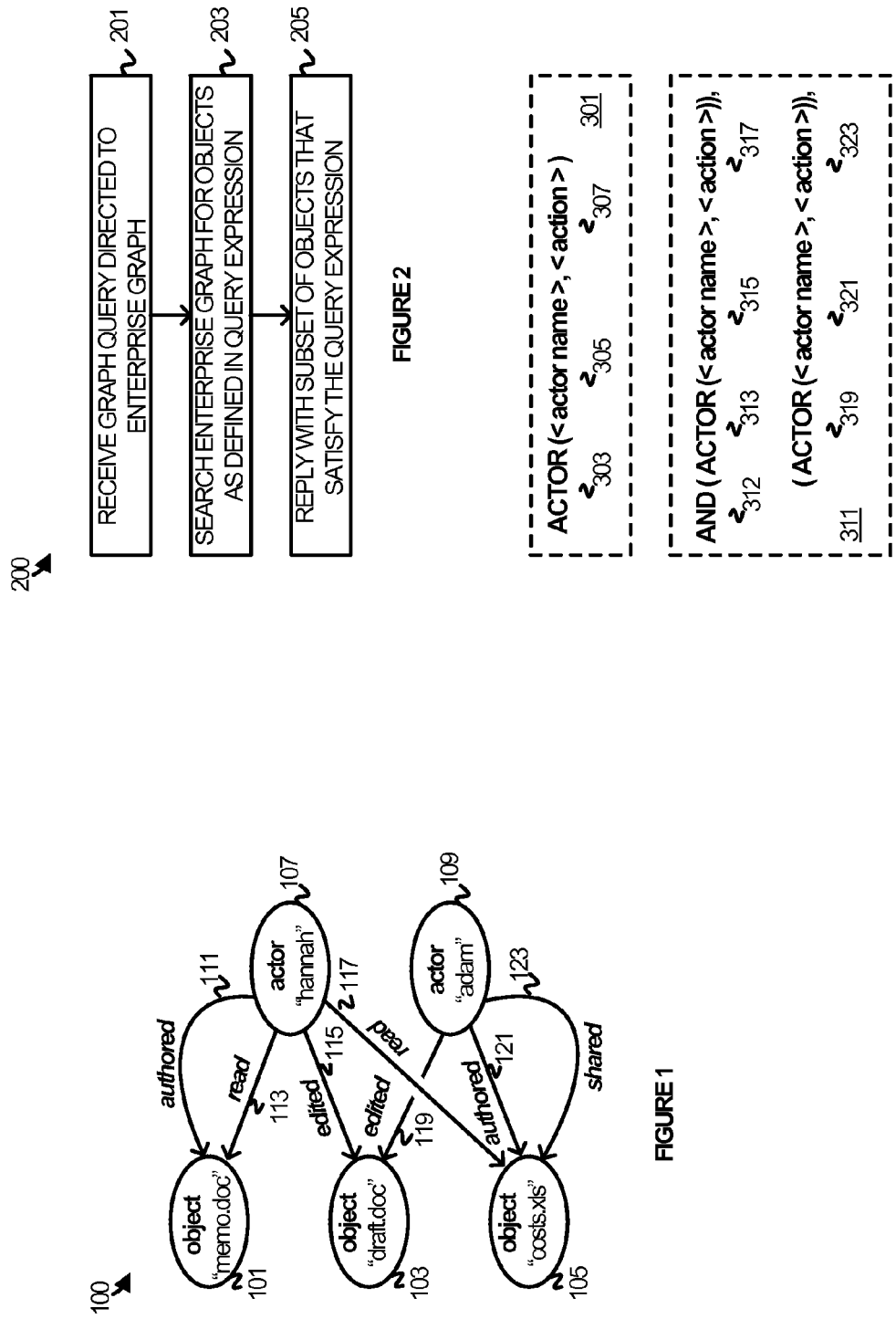

| 401 | QUERY: ACTOR (hannah, action: authored) |
| | RESULTS: memo.doc |

| 403 | QUERY: AND (ACTOR (hannah, action: read), ACTOR (adam, action:shared)) |
| | RESULTS: costs.xls |

| 405 | QUERY: OR (ACTOR (hannah, action: authored), ACTOR (adam, action:authored)) |
| | RESULTS: memo.doc, costs.xls |

| 407 | QUERY: OR (ACTOR (hannah, action: OR (edited, authored)), ACTOR (adam, action:authored)) |
| | RESULTS: memo.doc, draft.doc, costs.xls |

FIGURE 4

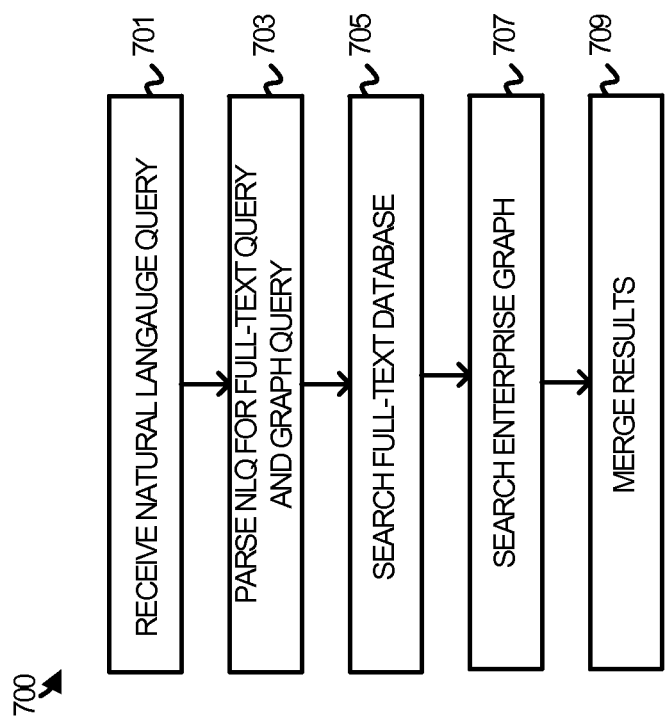

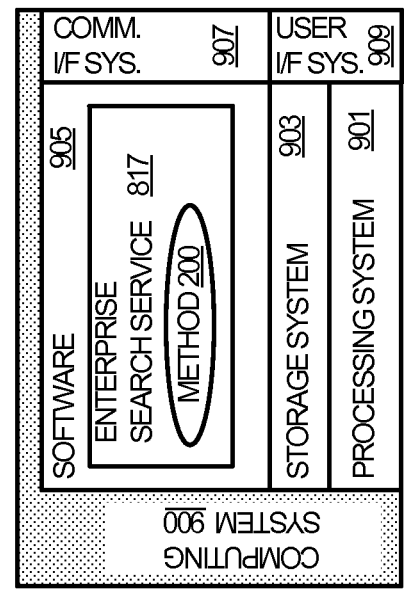
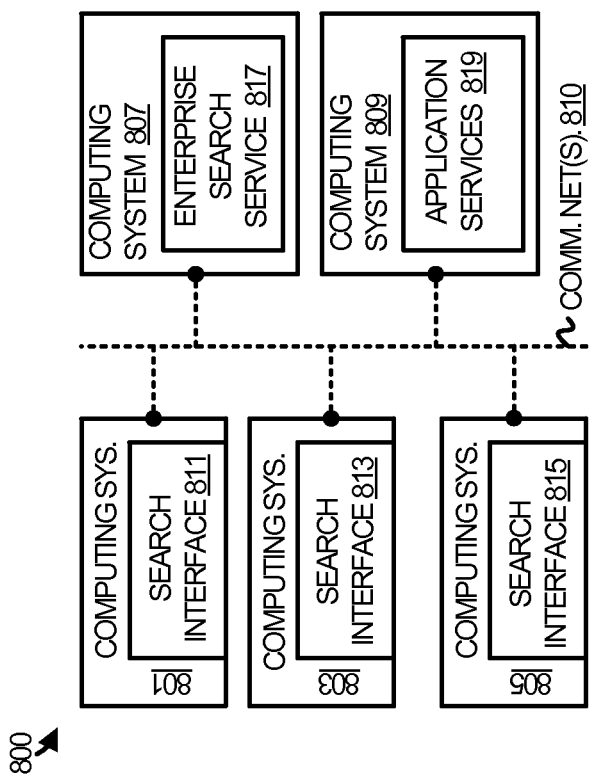

ENTERPRISE GRAPH SEARCH BASED ON OBJECT AND ACTOR RELATIONSHIPS

TECHNICAL FIELD

Aspects of the disclosure are related to computing hardware and software technology, and in particular to enterprise graph search.

TECHNICAL BACKGROUND

Graph search is rapidly becoming ubiquitous within a variety of different contexts. The basis for graph searching are graphs, which are data structures that represent entities in terms of their connections to each other. The basic elements of a graph are nodes and edges. Nodes typically represent any kind of entity, such as a person or object, while edges represent the connections between them. A graph of a social network, for instance, may include nodes that represent all of the people in a group of people and edges that represent how they are connected to each other. Other fields in which graphs and graph analysis have proven very effective for organizing and searching information include transportation, biology, and economics.

In the social networking context, users can perform graph searches to discover other people that might share their interests or to discover particular things about people already in their network. Examples include searching a social graph for a list of friends that like a particular entity, such as a particular restaurant, for any photos taken by a particular person, or for any photos taken of a particular person. Such queries can be made even more powerful with the addition of Boolean operators. For instance, a graph query directed to a social graph may ask for any people who like both one entity and another, or for people who have visited a particular place and also like a particular entity.

In the foregoing examples, the type of objects that are the subject of a graph search are limited to the types specified in the query itself and are known prior to commencing the search. Thus, photos are the target of searches for photos of a particular person, friends are the target of a search for friends that like a particular entity, and so on.

In the context of enterprise search, such search tools may be less than optimal due to the wide variety of objects with which people interact. In just one limited example, a graph of a person's connections in an enterprise may represent a variety of object types, such as documents, presentations, emails, and invitations with which they may interact. In addition, they may interact with the objects in many different ways, such as by authoring, editing, and sharing documents, or sending, receiving and forwarding emails.

OVERVIEW

Provided herein are systems, methods, and software for facilitating enhanced enterprise graph search capabilities that allow an enterprise graph to be searched for different kinds of objects based on which actors performed which actions on the objects. In this manner, users in an enterprise setting can find relevant objects with greater ease.

In at least one implementation, an enterprise search service receives a search request that includes a graph query directed to an enterprise graph. The graph is representative of various objects and actors associated with an enterprise, as well as which of the actors performed which of various actions with respect to each of the various objects. The service searches at least a portion of the enterprise graph to identify a subset of the objects that relate to the actors as defined by the graph query in terms of at least the actors and actions. A reply to the search request may include graph results indicative of the subset of the objects.

This Overview is provided to introduce a selection of concepts in a simplified form that are further described below in the Technical Disclosure. It should be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 1 illustrates an enterprise graph in an implementation.

FIG. 2 illustrates a method for performing an enterprise search with respect to an enterprise graph in an implementation.

FIG. 3 illustrates examples of a syntax for graph search in an implementation.

FIG. 4 illustrates examples of graph queries in an implementation.

FIG. 7 illustrates a method of operating an enterprise search service in an implementation.

FIG. 8 illustrates a search environment in an implementation

FIG. 9 illustrates a computing system in an implementation.

TECHNICAL DISCLOSURE

Figure 5:
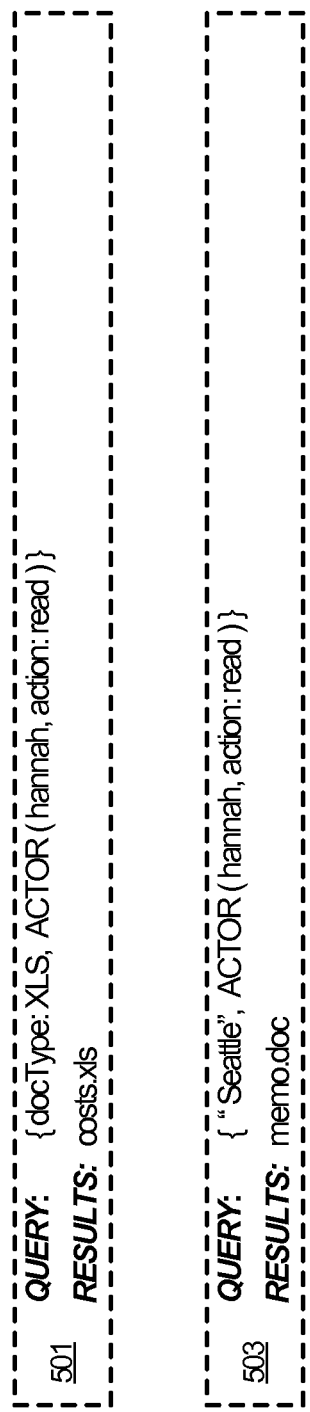
FIG. 5 illustrates examples of graph queries in an implementation.

Implementations disclosed herein enable enhanced graph search in which objects may be identified from an enterprise graph based how they are connected to actors in terms of actions. In an enterprise setting, a user may interact with many different services, examples of which include email, document and file management services, contact managers, instant messaging application, and telecommunication services, to name just a few. Numerous events are created each day by such interaction that involve a user, or actor, performing actions with respect to a variety of different kinds of objects, such as documents, spreadsheets, emails, and phone calls. The interactions can be captured in a searchable enterprise graph representative of what actions the actors took with respect to the objects.

The enterprise graph can be queried on the basis of which actors performed specific actions on any kind of objects. For example, a user interfacing with an enterprise search service may form a query directed to an enterprise graph that asks for any objects acted upon by a specific actor in accordance with a specific action. The enterprise graph can be searched for objects that satisfy such a graph query expression. The qualifying objects, or information indicative of them, can be returned in response to the query. In some implementations, the results of the graph search may be combined with or refined in view of results from other searches, such as a full-text search or another graph search.

In an implementation, interactions with an enterprise may be monitored such that an enterprise graph can be built that describes actors in the enterprise and objects with respect to which the actors took various actions. The enterprise graph may describe, for example, which documents specific actors in the enterprise authored, read, edited, modified or shared. Other examples include emails sent, received, or forwarded, blog posts authored, read, or commented on, meetings scheduled and attended, and any other type of event that can be monitored in an enterprise and represented in a corresponding enterprise graph.

The enterprise graph can then be queried for documents, emails, blog posts, or any other relevant objects acted upon in a specific way by a specific actor. For instance, a query may ask for any objects authored by a particular person. Such queries may follow a syntax that describe relationships in terms of actor-action-object triplets. In some implementations, an ACTOR operator may be employed to call a search function that examines an enterprise graph for all actions of an actor that satisfy a filter defined associated with the operator. The filter may name the actor and the action such that any related objects can be found. Boolean logic can be included to further narrow or filter search results. For example, an enterprise graph may be queried for any objects authored by one person and modified by another. Any Boolean operated may be supported, including AND, OR, and ANDNOT).

In some implementations, graph search and full-text search may be combined. In one example, a set of objects may be maintained. A graph can be constructed of the set and its relationships with the specific person and other actors. At the same time, a full-text index can be constructed of the set. In some cases, the graph and the full-text index may be co-located. Combined queries can be directed to the graph and the full-text index, such as asking for objects authored by one specific person and pertaining to a specific topic.

An enterprise graph in some scenarios has edges and nodes. The nodes may represent actors and objects while the edges represent connections between them. The edges may have various properties, such as the type of action that the edge represents, the target of the edge, the source of the edge (an email system or file storage system, for example, or an actor or object), a date or time stamp, a relative importance of the action, and whether or not the action is private or public. Other edge properties in addition to or in place of those disclosed herein are possible.

Nodes may be identified in an enterprise graph by a node identifier (ID). For example, a person, a document, email, or other object may have been assigned or can be assigned an identifier used to represent it in the enterprise graph. Other types of identifiers are possible and may be considered within the scope of the present disclosure. Edges can also be given weights to indicate their relative importance. This may be useful in the context of two edges of the same type to indicate the importance of one relative to the other.

In many scenarios, the actors in an enterprise graph may be representative of enterprise users, such as employees, contractors, or other works associated with the enterprise. The objects in the enterprise graph may be representative of various documents and other information objects with which the enterprise users interact. In such scenarios, representative edges are created when the enterprise users, for example, perform various actions on the objects, such as reading, modifying, and sharing documents.

However, it may be appreciated that documents and other types of information items may also be considered actors in some situations. For instance, one document may reference another, an email may attach a document, or a contact may describe contact information for a person. In these and other examples, the documents may be considered actors. In addition, a person may be considered an object when the person is the subject of an action taken by an information item.

Figure 6:
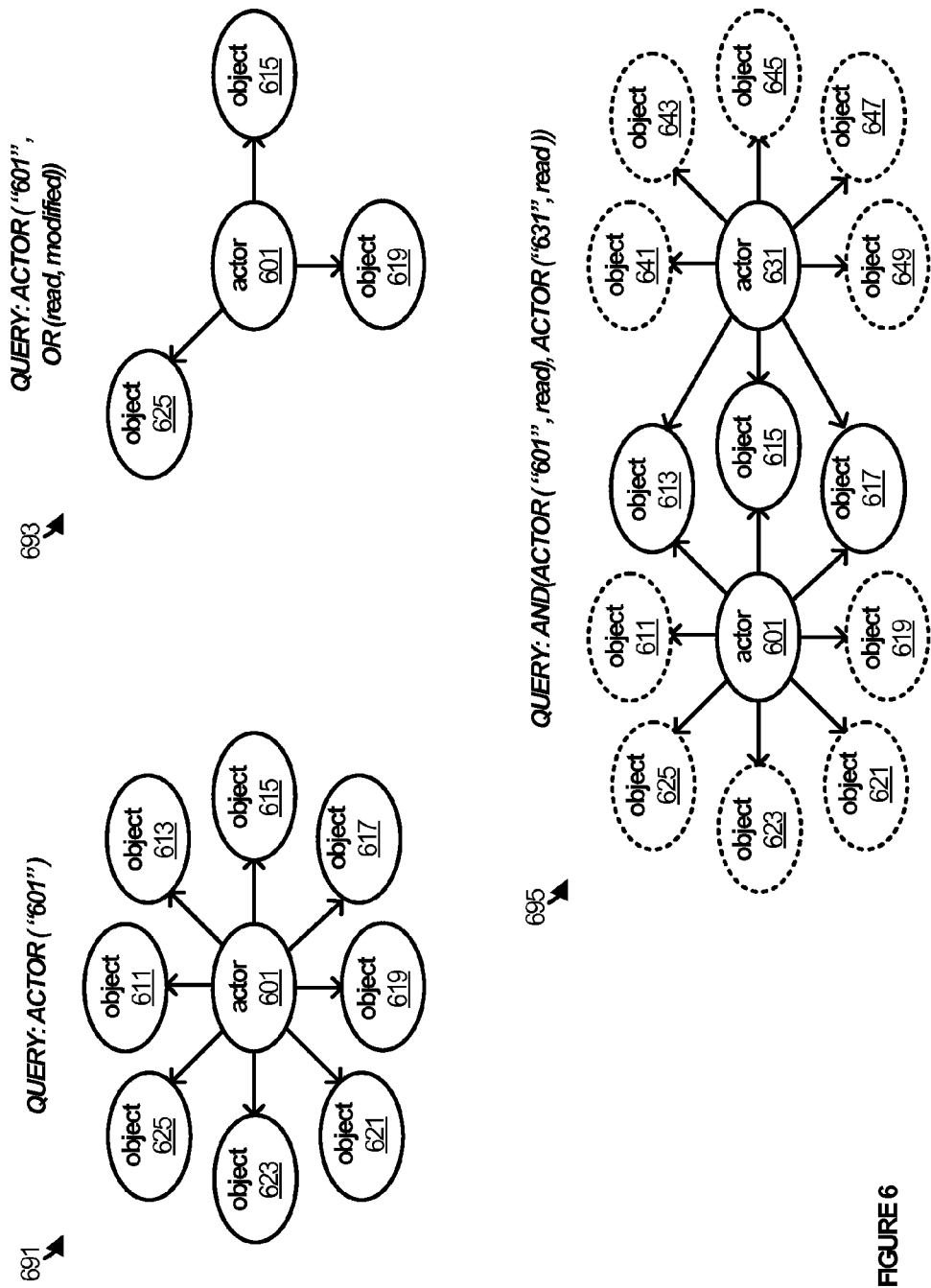
FIG. 6 illustrates examples of graph queries in an implementation.

Referring now to the drawings, FIG. 1 illustrates an enterprise graph, while FIG. 2 illustrates a method for searching the enterprise graph. FIG. 3 illustrates a representative syntax and FIG. 4 and FIG. 5 illustrate various examples using the syntax. FIG. 6 illustrates additional search examples while FIG. 7 illustrates another method for performing enterprise graph search. FIG. 8 illustrates a search environment in which enhanced enterprise search may be implemented, while FIG. 9 illustrates a representative computing system that may be used for various aspects of graph search.

Turning to FIG. 1, enterprise graph 100 is illustrated in an implementation. Enterprise graph 100 includes nodes and edges and is representative of how various objects associated with an enterprise are related to various actors in the enterprise in terms of what actions the actors performed with respect to each of the objects. Enterprise graph 100 can be queried in terms of actors and actions in order to identify objects relevant to a search.

In enterprise graph 100, the objects are generally described in terms of documents and other information items, while the actors are generally described in terms of people in an enterprise. This is merely for exemplary purposes and is not intended to limit the scope of the present disclosure. Rather, it may be appreciated that documents and other information items may at times be actors, while users may be considered objects.

Referring still to FIG. 1, in this implementation nodes 101, 103, and 105 are representative of objects in an enterprise, while nodes 107 and 109 are representative of actors in the enterprise. Nodes 101, 103, and 105 are connected to nodes 107 and 109 by way of edges 113, 115, 117, 119, 121, and 123. For example, node 107, representative of an actor named "Hannah," is connected to node 101, representative of an object named "memo.doc," which in this case is a document. Node 107 is connected to node 101 by edge 111 and edge 113, which represent that Hannah authored and read the document respectively. The actor Hannah also edited the object named "draft.doc" (a document) and read the object named "costs.xls," (a spreadsheet), as represented by edge 115 and edge 117 connecting node 107 to node 103 and node 105 respectively.

Referring to node 109, an actor named "Adam" is represented. The actor Adam edited the document represented by node 103 and as indicated by edge 119 connecting node 109 to node 103. In addition, the actor Adam authored and shared the spreadsheet represented by node 105 and as indicated by edge 121 and edge 123 connecting node 109 and node 106 respectively.

FIG. 2 illustrates a method 200 for performing an enterprise search for relevant objects in terms of actors and actions. Method 200 may be implemented within the context of an enterprise search service and by any suitable computing system or collection of computing system, of which computing system 900 is representative. Method 200 may be implemented by a single computing system or may be implemented in a distributed manner across multiple computing systems.

In at least one scenario, users engage with some aspects of the enterprise search service using their local computing systems, such as smart phones, tablet computers, laptop computers, desktop computers, gaming machines, Internet appliances, virtual machines, or any other type of computing machine, combination of machines, or variations thereof. The local computing systems may then communicate with a remote computing system or collection of computing systems in a data center or other suitable environment to engage other aspects of the service. Examples of such computing systems include server computers, virtual servers, or any other suitable computing system, combinations of systems, or variations thereof.

In operation, the enterprise search service receives a graph query directed to enterprise graph 100 (step 201). The graph query may be an independent query or it may be part of another query. For instance, a natural language query may be submitted that can then be parsed into a full-text query and the graph query. Regardless, the graph query requests that the enterprise search service return any objects relevant to a graph query expression included in the graph query. The graph query expression defines in terms of actors and actions which object in enterprise graph 100 are relevant to the search. In other words, the enterprise search service will return which ever objects in enterprise graph 100 satisfy the graph query expression.

Next, the enterprise search service searches enterprise graph 100 to identify relevant objects based on the graph query expression (step 203). Objects in the enterprise graph 100 that are related to the actors by various actions specified in the graph query expression can be returned. Accordingly, the enterprise search service replies to the graph query with graph results indicative of the qualifying objects (step 205), such as a list identifying the objects. It may be appreciated that the objects themselves could also be returned. Not all of objects discovered as a result of the search need be returned. Rather, additional filters or other analysis may be applied, such as a full-text analysis, to the graph results such that a subset of the results are returned. The graph results may also be combined with results from other searches, such as another graph search of a different graph, another graph search of enterprise graph 100, or a full-text search.

FIG. 3 illustrates various examples of a syntax in accordance with which a graph query expression may be developed for examining enterprise graph 100. In example 301, a graph query expression includes an element 303 that specifies an ACTOR operator, an element 305 that specifies the name of an actor, and an element 307 that specifies an action. The ACTOR operator combined with the name of the actor and the name of the action together function to define which objects to return with respect to a search. The enterprise search engine will recognize the ACTOR operator and will examine enterprise graph 100 for any objects related to an actor specified by the actor name by way of an action specified by the action name. In terms of edges and nodes, the ACTOR operator will function to return any nodes representative of any objects related to a node associated with the actor name by way of edges associated with the action name.

Example 311 illustrates the use of an AND in a graph expression. In example 311, a graph expression is provided that includes element 312 that specifies the AND operator. Element 313 specifies the ACTOR operator, while element 315 and element 317 specify an actor name and an action name respectively. In addition, Element 319 specifies another element 319 in the ACTOR operator, while element 321 and element 323 specify another actor name and another action name respectively. Thus, the graph query expression in example 311 functions to perform a Boolean search of enterprise graph 100 in which any object related to both actors by the action or actions specified in the expression are returned. Other Boolean operators are possible and may be considered within the scope of this disclosure.

FIG. 4 illustrates several examples of queries formed in accordance with the syntax described with respect to FIG. 3. FIG. 4 also illustrates exemplary results that may be returned in response to the queries.

In example 401, a query is submitted with respect to enterprise graph 100 that specifies the ACTOR operator and names Hannah as the actor and authored as the action. In other words, the query expression seeks to return any objected authored by Hannah. Referring to enterprise graph 100 in FIG. 1, node 107 (corresponding to Hannah) is connected to node 101 by way of edge 111, which defines the connection between node 101 and node 107 as one of authoring. Thus, the document represented by node 101 is returned, which is representative of the document memo.doc.

With respect to example 403, a query is submitted with respect to enterprise graph 100 that specifies the AND operator, which encompasses two instances of the ACTOR operator. In particular, the graph query expression specifies that any object be returned that Hannah has read and that Adam has shared. Referring to enterprise graph 100 in FIG. 1, node 107 (corresponding to Hannah) is connected to node 101 by way of edge 113, which defines the connection between node 101 and node 107 as one of the document represented by node 107 having been read. However, node 101 is not connected to node 109 and therefore does not satisfy the graph query expression.

Node 105 is representative of an object read by Hannah as it is connected to node 101 by edge 117, which indicates the object as having been read. In addition, node 105 is the only node connected to node 109 by an edge indicative of an object having been shared. Accordingly, node 105 (corresponding to the costs.xls object) is returned.

Example 405 illustrates an OR operation. In example 405, a query is submitted with a graph query expression that specifies the OR operator, which encompasses two instances of the ACTOR operator. The graph query expression specifies that any object be returned that Hannah has authored or that Adam has authored. Referring to enterprise graph 100 in FIG. 1, node 107 (corresponding to Hannah) is connected to node 101 by way of edge 111, which defines the connection between node 101 and node 107 as one of the document represented by node 107 having been authored. In addition, edge 121 connects node 109 to node 105 and indicates the object represented by node 105 as having been authored. Accordingly, two objects are returned: one corresponding to node 101 (memo.doc) and another corresponding to node 105 (costs.xls.)

A nested OR operation is illustrated in example 407. In example 407 the graph query expression an initial OR operator that encompasses two ACTOR operators. However, one of the ACTOR operators itself encompasses an OR operator. Thus, the graph query expression in example 407 functions to specify any qualifying object in enterprise graph 100 as one that edited or authored by Hannah, or one that is authored by Adam. As such, three objects are returned: memo.doc, draft.doc, and costs.xls. This is because node 107 is connected to node 101 by edge 111, representative of an object having been authored by Hannah. Node 107 is connected to node 103 by edge 115, representative of an object having been edited by Hannah. Lastly, node 109 is connected to node 105 by edge 121, representative of an object having been authored by Adam.

The following are several example queries to demonstrate some search capabilities contemplated herein. The following examples related to an actor having an actor ID of 1234. A call to a search engine in the form of "ACTOR (1234)" returns any objects associated with the actor. A call in the form of "ACTOR (1234, action:read)" returns any objects read by the actor. A call in the form of "ACTOR (1234, action:OR(authored, modified))," returns any objects the actor has authored or modified. A query in the form of "ACTOR(1234, AND(action:modified, time:RANGE(2012-01-23,max,from="GT")))" returns any objects modified in the last day. A query in the form of "ACTOR(1234, OR(AND(action:modified, time:RANGE(2012-01-23,max, from="GT")), action: author))" returns any object modified in the last day or written at any time. A query in the form of "AND(ACTOR(1234), ACTOR(5678))" returns documents associated with both one actor and another represented by the ID 5678. A query in the form of "AND(ACTOR(1234, action:author), ACTOR(5678, action:read))" returns objects authored by one actor represented by the ID 1234 and read by another represented by the ID 5678.

FIG. 5 illustrates two examples of hybrid searches in which a full-text query and a graph query are provided. In example 501, the query includes a graph query expression indicating the enterprise graph 100 be searched for and objects having been read by Hannah. However, the query also includes a full-text part specifying that any objects also be of the spreadsheet type (XLS documents). Per FIG. 1, Hannah is illustrated as having read both a word processing document (memo.doc) and a spreadsheet (cost.xls). However, since the query is specific about the file type being sought in connection with Hannah, only the spreadsheet is returned.

In example 503, another hybrid search is presented from which a graph search is performed and a full-text search is performed. In this example, the search request includes a graph query expression that defines any qualifying objects as those that Hannah has read. However, the search request also includes text criteria specifying that any qualifying object is to have the word "Seattle" included within it. Per FIG. 1, Hannah has read two documents: that memo.doc document represented by node 101 and the costs.xls document represented by node 105. For exemplary purposes it is assumed that only the memo document includes the word Seattle. Accordingly, the search results include only that object.

The following two examples represent combined graph and full-text queries. A call in the form of "{docType:pdf, ACTOR(1234, action:read)}" returns any presentation documents read by an actor associated with the identifier 1234. A call in the form of "{"economics", ACTOR(5678, action:read)}" returns any objects read by the actor pertaining to the topic of economics.

FIG. 6 illustrates three examples involving several queries that may be considered in sequence to better understand some aspects of the disclosure. In FIG. 6, it is assumed for exemplary purposes that an enterprise graph exists that includes various nodes representative of objects and actors and also includes edges representative of actions taken by the actors with respect to the objects. Examples 691, 693, and 695 illustrate some results that may occur in response to several different queries to the graph.

In example 691, the query asks for any objects acted upon by actor 601. The results, shown in FIG. 6, include object 611, 613, 615, 617, 619, 621, 623, and 625. It may be assumed for exemplary purposes that objects 611-625 are a sub-set of all of the objects represented in the enterprise graph.

In example 693, the query is accentuated by limited the previous results to only those objects read or modified by actor 601. The resulting sub-set of objects include only object 615, object 619, and object 625.

In example 695, the presented scenario is slightly more complex in that a query is made for any object read by both actor 601 and actor 631. All of the objects read by actor 601 are returned, including objects 611-625, for exemplary purposes. All of the objects read by actor 631, including objects 641, 643, 645, 647, 649, 613, 615, and 617, are also illustrated. However, those illustrated with solid lines are intended to represent the results of the query, whereas those illustrated with dashed lines are intended to represent the remainder of the set that do not satisfy the graph query expression. Thus, only object 613, object 615, and object 617 satisfy the request for any object read by both actor 601 and 631.

FIG. 7 illustrates a method 700 for operating an enterprise search service to handle natural language queries. In operation, natural language queries may be submitted that do not adhere to any specific query syntax. For example, a user may input a search string such as "any spreadsheets authored by Hannah about Seattle." The enterprise search service receives the search request (step 701) and parses it into at least two parts: one related to a full-text query and one related to a graph query (step 703). In this example, a graph query in the form of ACTOR (Hannah, action: authored) may be generated and applied against an enterprise graph, such as enterprise graph 100. A related full-text search may also be generated that searches a full-text database for any documents that mention the word "Seattle." A search of a full-text database is then performed using the full-text query (Step 705) and a graph search is performed using the graph query.

In some cases the full-text database (or its index) may be searched in parallel to the searching the graph. In other cases, the full-text search can be performed with respect to results of the graph search to further limit what was returned by the graph query. In any case, the two types of search may be combined in some manner to produce combined or merged results (step 707) that can be returned in reply to the natural language query.

Privacy concerns may be addressed with respect to the implementations described above by limiting search results to only those objects to which a user has access. This can be accomplished in a variety of ways, such as be examining a user's access rights and comparing them to properties of an object. The user may be limited from viewing the object, but the object itself can be entirely removed from a set of search results.

FIG. 8 illustrates a search environment 800 that is representative of any environment in which the various implementations of enterprise graph search discussed herein may be carried out. Search environment 800 includes communication network 810 over which computing systems 801, 803, and 805 may possibly communicate with computing system 807 and with computing system 809.

Examples of computing systems 801, 803, and 805 include, but are not limited to, desktop computers, work stations, laptop computers, notebook computers, tablet computers, mobile phones, personal digital assistances, media devices, gaming devices, and any other physical or virtual computing machine or combinations and variations thereof. Computing systems 801, 803, and 805 may be capable of implementing search interfaces 811, 813, and 815 respectively. Search interfaces 811, 813, and 815 may each be representative of any hardware, software, or combinations thereof capable of providing an interface to enterprise search service 817 such that users can interact with computing systems 801, 803, and 805 to perform enterprise searches.

Computing system 807 may be any computing system or collection of computing systems capable of implementing an enterprise search service 817. Computing system 809 may also be any computing system or collections of system capable of implementing any one or more of application services 819. Examples of computing system 807 and computing system 809 include server computers, cloud computing platforms, data centers, and any physical or virtual computing machine, as well as any variation or combination thereof.

Computing system 900 is representative of any computing system suitable for implementing any of computing systems 801, 803, 805, 807, and 809, all though the discussion below makes specific reference to computing system 807 for purposes of clarity. In addition, while enterprise search service 817 is illustrated as implemented separately from a search interface, or remotely from the devices with which a user may interact, it may be appreciated that all or portions of enterprise search service 817 may be implemented locally with respect to a user, such as in a co-located fashion on a device operated by a user, such as computing systems 801, 803, and 805.

In operation, computing systems 801, 803, and 805 may communicate with computing system 807 to perform enterprise searches. This may include communicating search requests to and receiving search replies from enterprise search service 817. Enterprise search service 817 handles the search request in accordance with the various implementations described herein, including searching an enterprise graph and returning relevant results.

In addition, computing systems 801, 803, and 805 may communicate from time to time with computing system 809 in the context of providing users with access to application services 819, such as productivity application services, file storage services, email services, chat services, blog services, voice and video services, or any other type of application service. However, some of all of the application service 819 may be implemented locally all or in part with respect to computing systems 801, 803, and 805. Within the context of these services, events may occur that can be captured and from which an enterprise graph or graphs may be constructed. Enterprise search service 817 may capture the events and construct the graph, although in some implementations these tasks may be allocated to another service or services.

Communication between any of the elements contemplated in FIG. 8 may occur in accordance with various communication protocols, such as the Internet protocol (IP, IPv4, IPv6, etc.), the transfer control protocol (TCP), and the user datagram protocol (UDP), as well as any other suitable communication protocol, variation, or combination thereof. Communication network 810 may be representative of a network or collection of networks over which the elements contemplated in FIG. 8 may exchange information, such as an intranet, the Internet, a local area network, a wide area network, a wireless network, a wired network, a virtual network, a software defined network, or any combination or variation thereof. Communication network 810 may include connections, devices, and communication media, such as metal, glass, air, or any other suitable communication media over which information may be exchanged. The aforementioned communication media, networks, connections, protocols, and devices are well known and need not be discussed at length here.

In any of the aforementioned examples in which information is exchanged, the exchange of information may occur in accordance with any of a variety of protocols, including FTP (file transfer protocol), HTTP (hypertext transfer protocol), REST (representational state transfer), Web Socket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

Referring now to FIG. 9, computing system 900 is representative of any computing system or collection of systems suitable for implementing all or portions of enterprise search service 817 and method 200, and optionally any of the other operational scenarios and examples described herein. Computing system 900 may be implemented as a single apparatus, system, or device or may be implemented in a distributed manner as multiple apparatuses, systems, or devices.

Examples of computing system 900 include server computers, cloud computing platforms, and data center equipment, as well as any other type of physical or virtual server machine, and any variation or combination thereof. While typically implemented in a server or collection of servers, enterprise search service 817 may also be implemented all or in part on desktop computers, laptop computers, tablet computers, notebook computers, mobile computing devices, cell phones, media devices, and gaming devices, as well as any other type of physical or virtual computing machine and any combination or variation thereof, of which computing system 900 is also representative.

Computing system 900 includes, but is not limited to, processing system 901, storage system 903, software 905, communication interface system 907, and user interface system 909, which is optional. Processing system 901 is operatively coupled with storage system 903, communication interface system 907, and user interface system 909. Processing system 901 loads and executes software 905 from storage system 903. When executed by processing system 901, software 905 directs processing system 901 to operate as described herein for method 200 or its variations, such as method 700, or as described herein for any of the operational scenarios and examples disclosed herein. Computing system 900 may optionally include additional devices or functionality not discussed for purposes of brevity.

Referring still to FIG. 9, processing system 901 may comprise a microprocessor and other circuitry that retrieves and executes software 905 from storage system 903. Processing system 901 may be implemented within a single processing device but may also be distributed across multiple processing devices or sub-systems that cooperate in executing program instructions. Examples of processing system 901 include general purpose central processing units, application specific processors, and logic devices, as well as any other type of processing device, combinations, or variations thereof.

Storage system 903 may comprise any computer readable storage media readable by processing system 901 and capable of storing software 905. Storage system 903 may include volatile and nonvolatile, removable and non-removable media implemented in any method or technology for storage of information, such as computer readable program instructions, data structures, program modules, or other data.

Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 903 may also include computer readable communication media over which software 905 may be communicated internally or externally. Storage system 903 may be implemented as a single storage device but may also be implemented across multiple storage devices or sub-systems co-located or distributed relative to each other. Storage system 903 may comprise additional elements, such as a controller, capable of communicating with processing system 901 or possibly other systems.

Software 905 may be implemented in program instructions and among other functions may, when executed by processing system 901, direct processing system 901 to operate as described herein for method 200 and its variations, and optionally as described with respect to the various operational scenarios and examples disclosed herein. In particular, the program instructions may include various components or modules that cooperate or otherwise interact to carry out method 200 or method 700. The various components or modules may be embodied in compiled or interpreted instructions or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 905 may include additional processes, programs, or components, such as operating system software or other application software. Software 905 may also comprise firmware or some other form of machine-readable processing instructions executable by processing system 901.

In general, software 905 may, when loaded into processing system 901 and executed, transform a suitable apparatus, system, or device (of which computing system 900 is representative) overall from a general-purpose computing system into a special-purpose computing system customized to facilitate enhanced enterprise search as described herein for each implementation. Indeed, encoding software 905 on storage system 903 may transform the physical structure of storage system 903. The specific transformation of the physical structure may depend on various factors in different implementations of this description. Examples of such factors may include, but are not limited, to the technology used to implement the storage media of storage system 903 and whether the computer-storage media are characterized as primary or secondary storage, as well as other factors.

For example, if the computer readable storage media are implemented as semiconductor-based memory, software 905 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be understood that computing system 900 is generally intended to represent a computing system or systems on which software 905 may be deployed and executed in order to implement method 200 or method 700 and optionally all or portions of the various operational scenarios and examples described herein. However, computing system 900 may also be suitable as any computing system on which software 905 may be staged and from where software 905 may be distributed, transported, downloaded, or otherwise provided to yet another computing system for deployment and execution, or yet additional distribution.

Communication interface system 907 may include communication connections and devices that allow for communication with other computing systems (not shown) over a communication network or collection of networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 900 and any other computing system (not shown) may occur over a communication network or networks and in accordance with various communication protocols, combinations of protocols, or variations thereof. Examples of communication networks over which computing system 900 may exchange information with other computing systems include intranets, the Internet, local area networks, wide area networks, wireless networks, wired networks, virtual networks, software defined networks, or any combination or variation thereof. The aforementioned communication networks and protocols are well known and need not be discussed at length here.

When applicable, user interface system 909 may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 909. In some cases, the input and output devices may be combined in a single device, such as a display capable of displaying images and receiving touch gestures. The aforementioned user input and output devices are well known in the art and need not be discussed at length here.

User interface system 909 may also include associated user interface software executable by processing system 901 in support of the various user input and output devices discussed above. Separately or in conjunction with each other and other hardware and software elements, the user interface software and user interface devices may support a graphical user interface, a natural user interface, or any other type of user interface. For example, a search interface to an enterprise search service may be presented through user interface system 909.

It may appreciated from the foregoing embodiment that an enterprise search service can be used to query an enterprise graph on the basis of actor-action-object relationships. Operating the enterprise search service may include receiving a search request that includes a graph query directed to an enterprise graph representative of objects associated with an enterprise and actors associated with the enterprise. The enterprise graph may also be representative of which of the actors performed which of a various actions with respect to each of the objects. At least a portion of the enterprise graph may be searched to identify a subset of the objects that relate to the actors as defined by the graph query in terms of at least the actors and the actions. The enterprise search service may then reply to the graph query with graph results indicative of the subset of objects.

In some implementations, the objects include documents and emails and the actions include composing, reading, modifying, sending, receiving, and forwarding the objects. The graph query may include a graph query expression that defines the subset of objects as any of the objects acted upon by at least one actor in accordance with at least one action. The enterprise graph may include nodes corresponding to the, nodes corresponding to the actors, and edges corresponding to the actions. Each of the edges may connect at least one of the objects to at least one of the actors. The graph query expression may specify at least one actor and at least the one action.

Searching the enterprise graph to identify the subset of objects that relate to the actors as defined by the graph query may include determining which subset of the nodes associated with the objects are connected to any of the nodes corresponding to the one actor by any of the edges corresponding to at least the one action.

The enterprise search service may also capture events occurring in the enterprise, deriving event information from the events representative of the objects, the actors, and the actions. The service can generate the enterprise graph based at least in part on the event information.

In some implementations, a search request includes a full-text query directed to a full-text database that includes at least some of the objects. Operating the service may also include searching at least a portion of the full-text database to identify an additional subset of objects based at least in part on the full-text query. The service may reply to the full-text query with full-text results indicative of the additional subset of objects. A reply to the search request may include at least a portion of graph search results and a portion of full-text search results. The search request in some scenarios may be a natural language query, in which case the graph query may be derived from at least a portion of the natural language query and the full-text query may be derived from another portion.

The enterprise search service may include a search interface to the service through which a user may enter a search request which, in some cases, may be a natural language query. In such scenarios, the natural language query is translated into at least a full-text query and a graph query or graph query expression.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method, implemented by a computing system, for performing enterprise search comprising:

receiving a search request comprising a graph query directed to an enterprise graph representative of a plurality of objects associated with an enterprise and a plurality of actors associated with the enterprise and further representative of which of the plurality of actors performed which of a plurality of actions with respect to each of the plurality of objects;

searching at least a portion of the enterprise graph to identify a subset of the plurality of objects that relate to the plurality of actors as defined by the graph query in terms of at least the plurality of actors and the plurality of actions;

receiving graph results indicative of the subset of the plurality of objects that relate to the plurality of actors as defined by the graph query;

searching at least a portion of the full-text database to identify an additional subset of the plurality of objects based at least in part on the full-text query;

receiving full-text results indicative of the additional subset of the plurality of objects; and merging the graph results and the full-text results to produce search results.

2. The method of claim 1 wherein the plurality of objects comprise documents and emails and wherein the plurality of actions comprise composing, reading, modifying, sending, receiving, and forwarding, and wherein the graph query comprises a graph query expression that defines the subset of the plurality of objects as any of the plurality of objects acted upon by at least one actor of the plurality of actors in accordance with at least one action of the plurality of actions.

3. The method of claim 2 wherein the enterprise graph comprises a first plurality of nodes corresponding to the plurality of objects, a second plurality of nodes corresponding to the plurality of actors, and a plurality of edges corresponding to the plurality of actions, wherein each the plurality of edges connects at least one of the plurality of objects to at least one of the plurality of actors.

4. The method of claim 3 wherein the graph query expression specifies at least the one actor and at least the one action, and wherein searching at least the portion of the enterprise graph to identify the subset of the plurality of objects that relate to the plurality of actors as defined by the graph query comprises determining which subset of the first plurality of nodes are connected to any of the second plurality of nodes corresponding to at least the one actor by any of the plurality of edges corresponding to at least the one action.

5. The method of claim 4 further comprising capturing a plurality of events occurring in the enterprise, deriving event information from the plurality of events representative of the plurality of objects, the plurality of actors, and the plurality of actions, and generating the enterprise graph based at least in part on the event information.

6. The method of claim 2 wherein the search request further comprises a full-text query directed to a full-text database comprising at least a portion of the plurality of objects and wherein the method further comprises:
replying to the search request with at least a portion of the graph results and at least a portion of the full-text results.

7. The method of claim 6 wherein the search request comprises a natural language query and wherein the method further comprises deriving the graph query from at least a portion of the natural language query and deriving the full-text query from another portion of the natural language query.

8. An apparatus comprising:
a processing system; and
one or more computer readable storage media including program instructions stored on the one or more computer readable media that, when executed by the processing system, direct the processing system to at least:
generate an enterprise graph representative of a plurality of objects associated with an enterprise and a plurality of actors associated with the enterprise and further representative of which of the plurality of actors performed which of a plurality of actions with respect to each of the plurality of objects;
search at least a portion of the enterprise graph to identify a subset of the plurality of objects that relate to the plurality of actors as defined by a graph query expression in a graph query in terms of at least the plurality of actors and the plurality of actions;
generate graph results indicative of the subset of the plurality of objects that relate to the plurality of actors as defined by the graph query expression;
search at least a portion of a full-text database to identify an additional subset of the plurality of objects based at least in part on the full-text query; and
generate full-text results indicative of the additional subset of the plurality of objects; and
merge the graph results and the full-text results to produce search results.

9. The apparatus of claim 8 further comprising the processing system configured to execute the program instructions, wherein the program instructions further direct the processing system to receive a search request comprising the graph query and reply to the graph query with the graph results.

10. The apparatus of claim 9 wherein the plurality of objects comprise documents and emails and wherein the plurality of actions comprise composing, reading, modifying, sending receiving, and forwarding, and wherein the graph query expression defines the subset of the plurality of objects as any of the plurality of objects acted upon by at least one actor of the plurality of actors in accordance with at least one action of the plurality of actions.

11. The apparatus of claim 10 wherein the enterprise graph comprises a first plurality of nodes corresponding to the plurality of objects, a second plurality of nodes corresponding to the plurality of actors, and a plurality of edges corresponding to the plurality of actions, wherein each the plurality of edges connects at least one of the plurality of objects to at least one of the plurality of actors.

12. The apparatus of claim 11 wherein the graph query expression specifies at least the one actor and at least the one action, and wherein:

to search at least the portion of the enterprise graph to identify the subset of the plurality of objects that relate to the plurality of actors as defined by the graph query expression, the program instructions direct the processing system to determine which subset of the first plurality of nodes are connected to any of the second plurality of nodes corresponding to at least the one actor by any of the plurality of edges corresponding to at least the one action.

13. The apparatus of claim 12 wherein the program instructions further direct the processing system to capture a plurality of events occurring in the enterprise, derive event information from the plurality of events representative of the plurality of objects, the plurality of actors, and the plurality of actions, and generate the enterprise graph based at least in part on the event information.

14. The apparatus of claim 10 wherein the search request further comprises a full-text query directed to a full-text database comprising at least a portion of the plurality of objects and wherein the program instructions further direct the processing system to:
reply to the search request with at least a portion of the graph results and at least a portion of the full-text results.

15. The apparatus of claim 14 wherein the program instructions further direct the processing system to receive a natural language query, generate the graph query from at least a portion of the natural language query, and generate the full-text query from another portion of the natural language query.

16. A method, implemented by a computing system, of operating an enterprise search service comprising:
receiving a search request comprising a natural language query;
translating at least part of the natural language query into at least a full-text query with which to search a full-text database comprising at least a portion of a plurality of objects associated with an enterprise;
translating at least part of the natural language query into a graph query comprising a graph query expression that defines a subset of the plurality of objects as any of the plurality of objects acted upon by at least one specific actor of a plurality of actors in accordance with at least one specific action of a plurality of actions;
searching at least a portion of an enterprise graph based at least in part on the graph query expression to identify the subset of the plurality of objects;
receiving graph results indicative of the subset of the plurality of objects that relate to the plurality of actors as defined by the graph query expression;
searching at least a portion of the full-text database to identify an additional subset of the plurality of objects based at least in part on the full-text query;
receiving full-text results indicative of the additional subset of the plurality of objects; and
merging the graph results and the full-text results to produce search results, wherein the search results include at least a portion of the graph results and at least a portion of the full-text results.

17. The method of claim 16 wherein the enterprise graph is representative of the plurality of objects, the plurality of actors, and which of the plurality of actors performed which of a plurality of actions with respect to each of the plurality of objects.

18. The method of claim 17 wherein the plurality of objects comprise documents and emails and wherein the plurality of actions comprise composing, reading, modifying, sending receiving, and forwarding, and wherein the enterprise graph comprises a first plurality of nodes corresponding to the plurality of objects, a second plurality of nodes corresponding to the plurality of actors, and a plurality of edges corresponding to the plurality of actions, wherein each the plurality of edges connects at least one of the plurality of objects to at least one of the plurality of actors.

19. The method of claim 18 wherein searching at least the portion of the enterprise graph to identify the subset of the plurality of objects that relate to the plurality of actors as defined by the graph query expression comprises determining which subset of the first plurality of nodes are connected to any of the second plurality of nodes corresponding to at least the one specific actor by any of the plurality of edges corresponding to at least the one specific action.

20. The method of claim 18 wherein one or more of the full-text results indicative of the additional subset of the plurality of objects are received from an enterprise search service and the graph results indicative of the subset of the plurality of objects that relate to the plurality of actors as defined by the graph query expression are received from an enterprise search service.

* * * * *